United States Patent
Moh et al.

(10) Patent No.: US 8,201,267 B2
(45) Date of Patent: Jun. 12, 2012

(54) CRYPTOGRAPHIC DEVICE HAVING ACTIVE CLEARING OF MEMORY REGARDLESS OF STATE OF EXTERNAL POWER

(75) Inventors: Sungwon Moh, Wilton, CT (US); Peter A. Pagliaro, Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 531 days.

(21) Appl. No.: 12/257,728

(22) Filed: Oct. 24, 2008

(65) Prior Publication Data

US 2010/0106289 A1 Apr. 29, 2010

(51) Int. Cl.
*G06F 21/00* (2006.01)

(52) U.S. Cl. .............................. 726/34; 726/36; 713/340

(58) Field of Classification Search .............. 726/26–33, 726/34, 36; 713/189–194, 340
See application file for complete search history.

(56) References Cited

U.S. PATENT DOCUMENTS

| | | |
|---|---|---|
| 4,593,384 A | 6/1986 | Kleijne |
| 4,691,350 A | 9/1987 | Kleijne et al. |
| 4,807,284 A | 2/1989 | Kleijne |
| 4,811,288 A | 3/1989 | Kleijne et al. |
| 4,860,351 A | 8/1989 | Weingart |
| 5,027,397 A | 6/1991 | Double et al. |
| 5,117,457 A | 5/1992 | Comerford et al. |
| 5,185,717 A | 2/1993 | Mori |
| 5,239,664 A | 8/1993 | Verrier et al. |
| 5,249,227 A | 9/1993 | Bergum et al. |
| 5,389,738 A | 2/1995 | Piosenka et al. |
| 5,406,630 A | 4/1995 | Piosenka et al. |
| 5,675,319 A | 10/1997 | Rivenberg et al. |
| 5,761,054 A | 6/1998 | Kuhn |
| 5,847,915 A * | 12/1998 | Tranchand .................... 361/111 |
| 5,858,500 A | 1/1999 | MacPherson |
| 5,880,523 A | 3/1999 | Candelore |
| 5,988,510 A | 11/1999 | Tuttle et al. |
| 6,424,954 B1 | 7/2002 | Leon |

(Continued)

FOREIGN PATENT DOCUMENTS

DE 19816571 10/1999

(Continued)

OTHER PUBLICATIONS

XP-002439510 FIPS PUB 140-2, Security Requirements for Cryptographic Modules, Issued May 25, 2001, United States of America, Department of Commerce.

*Primary Examiner* — Edward Zee
*Assistant Examiner* — Chi Nguy
(74) *Attorney, Agent, or Firm* — Brian A. Lemm; Charles R. Malandra, Jr.; Steven J. Shapiro

(57) ABSTRACT

A cryptographic device that will actively clear its memory even in the absence of external power when a security breach is detected is provided. The memory cell clusters of the cryptographic device are provided with an internal power source that provides sufficient energy for the memory cell clusters to perform a clearing operation. If the external power source for the memory is removed and a physical security breach is detected, the power from the internal power source will allow the memory cells to actively clear their contents, thereby rendering any attempt to obtain the contents of the memory cells fruitless.

6 Claims, 2 Drawing Sheets

U.S. PATENT DOCUMENTS

| | | |
|---|---|---|
| 6,438,825 B1 | 8/2002 | Kuhn |
| 6,686,539 B2 | 2/2004 | Farquhar et al. |
| 6,853,093 B2 | 2/2005 | Cohen et al. |
| 6,929,900 B2 | 8/2005 | Farquhar et al. |
| 6,957,345 B2 | 10/2005 | Cesana et al. |
| 6,970,360 B2 | 11/2005 | Sinha |
| 6,982,642 B1 | 1/2006 | Cesana et al. |
| 7,007,171 B1 | 2/2006 | Butturini et al. |
| 7,015,823 B1 | 3/2006 | Gillen et al. |
| 7,043,631 B2 | 5/2006 | Baum et al. |
| 7,054,162 B2 | 5/2006 | Benson et al. |
| 7,218,567 B1 * | 5/2007 | Trimberger et al. .......... 365/228 |
| 7,873,853 B2 * | 1/2011 | Muraoka .................. 713/340 |
| 2002/0073349 A1 * | 6/2002 | Turner et al. .................. 713/340 |
| 2004/0066274 A1 | 4/2004 | Bailey |
| 2008/0175045 A1 * | 7/2008 | Lin .................. 365/182 |
| 2010/0169671 A1 * | 7/2010 | Coussieu et al. .............. 713/193 |

FOREIGN PATENT DOCUMENTS

| | | |
|---|---|---|
| DE | 19816572 | 10/1999 |
| EP | 0629497 | 12/1994 |
| GB | 2174830 | 11/1986 |
| GB | 2330439 | 4/1999 |
| WO | 9921142 | 4/1999 |
| WO | 0163994 | 8/2001 |

* cited by examiner

CRYPTOGRAPHIC DEVICE HAVING ACTIVE CLEARING OF MEMORY REGARDLESS OF STATE OF EXTERNAL POWER

FIELD OF THE INVENTION

The invention disclosed herein relates generally to secure cryptographic devices, and more particularly to secure cryptographic devices that can actively clear memory contents when physical security is breached regardless of the state of external power.

BACKGROUND OF THE INVENTION

Cryptographic systems typically operate by transforming data through a mathematical algorithm in conjunction with a secret key, referred to as a cryptographic key, to generate a digital signature (in public key systems) or message authentication code (MAC) (in symmetric key systems). Cryptographic systems typically include one or more processing devices utilized to perform the required operations along with one or more memory devices used to store the algorithms and secret key(s) utilized during the cryptographic operations. Cryptographic systems have many applications both for the secure transmission of information and for the authentication and verification of the source of information. One such application is the verification of payment of postage. The vast majority of the Posts around the world require prepayment for provided postal services. Prepayment, however, requires verifiable evidence of paid postage. One method for providing verifiable evidence of paid postage is the printing of an indicium, including a digital signature, that is generated by a cryptographic device, often referred to as a Postal Security Device (PSD), contained within a postage meter.

Verification of the digital signature proves that the indicium was generated by an authorized postage meter using the cryptographic key. The information printed in the indicium and access to a verifying key are sufficient for the detection of counterfeit indicia as long as the cryptographic key of the postage meter is confidential. As such, maintaining the security of such cryptographic keys in postage meters (or any other devices that include a cryptographic device) is critical to prevent the generation of counterfeit digital signatures or MACs. Accordingly, PSDs are typically provided with security to prevent such keys from being obtained. For example, the cryptographic keys are not permanently stored within the PSD, but instead are stored in volatile memory such that removal of power from the memory of the PSD will result in contents of the memory, e.g., the cryptographic keys, being lost due to the discharge of the memory cells. This requires that PSDs be provided with an uninterruptible source of power, typically in the form of an external battery, such that the contents of the memory will not be lost when the postage meter is not connected to a supply source (i.e., plugged into an electrical outlet). In addition, PSDs are provided with physical security, such as, for example, tamper barriers or the like, that will detect tampering with the device in an attempt to obtain the key. Such tampering can include, for example, physical penetration with probes or leads in attempts to obtain the cryptographic keys stored in the memory of the PSD. PSDs are required by the United States Postal Service to comply with Federal Information Processing Standards (FIPS) publication 140-2, level 3, issued by the National Institute of Standards and Technology (NIST), which requires that PSDs have a full envelope of physical tamper protection and detection which encloses all electrical nodes. Detection of a tamper activity results in the memory of the PSD being cleared, typically within nanoseconds of the tamper detection, thereby rendering any such tamper activity fruitless in obtaining the stored cryptographic keys.

There are known attacks aimed at defeating the security to obtain the data, e.g., cryptographic keys, stored therein. One such attack involves shorting the battery that supplies power to the memories in the PSD. This prevents the clearing from occurring, as the memory devices are no longer provided with power. To increase the decay time of the memory contents, it is also known to quickly drop the temperature of the PSD to very low levels, e.g., −20° C. or −30° C. Because of the cold temperature, the discharge of the memory cells will be significantly slower. The combination of the memory device being unable to actively clear and the slow discharge of the memory cells can allow sufficient time for an attacker to obtain the contents of the memory, e.g., the cryptographic keys, before the memory fully discharges and the data contained therein is lost.

Thus, using an attack similar to one described above, it may be possible to obtain the cryptographic keys stored within a cryptographic device, resulting in the ability to generate counterfeit digital signatures or MACs.

SUMMARY OF THE INVENTION

The present invention significantly decreases, if not completely reduces, the chances of successfully obtaining cryptographic keys utilizing an attack similar to that as described above by ensuring that the cryptographic device will actively clear its memory even in the absence of external power when a security breach is detected.

In accordance with the present invention, the memory cell clusters of the cryptographic device are provided with an internal power source that provides sufficient energy for the memory cells to perform a clearing operation. If the external power source for the memory is removed and a physical security breach is detected, the power from the internal power source will allow the memory cells to actively clear their contents, thereby rendering any attempt to obtain the contents of the memory cells fruitless.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate a presently preferred embodiment of the invention, and together with the general description given above and the detailed description given below, serve to explain the principles of the invention. As shown throughout the drawings, like reference numerals designate like or corresponding parts.

DETAILED DESCRIPTION OF THE INVENTION

Figure 1:
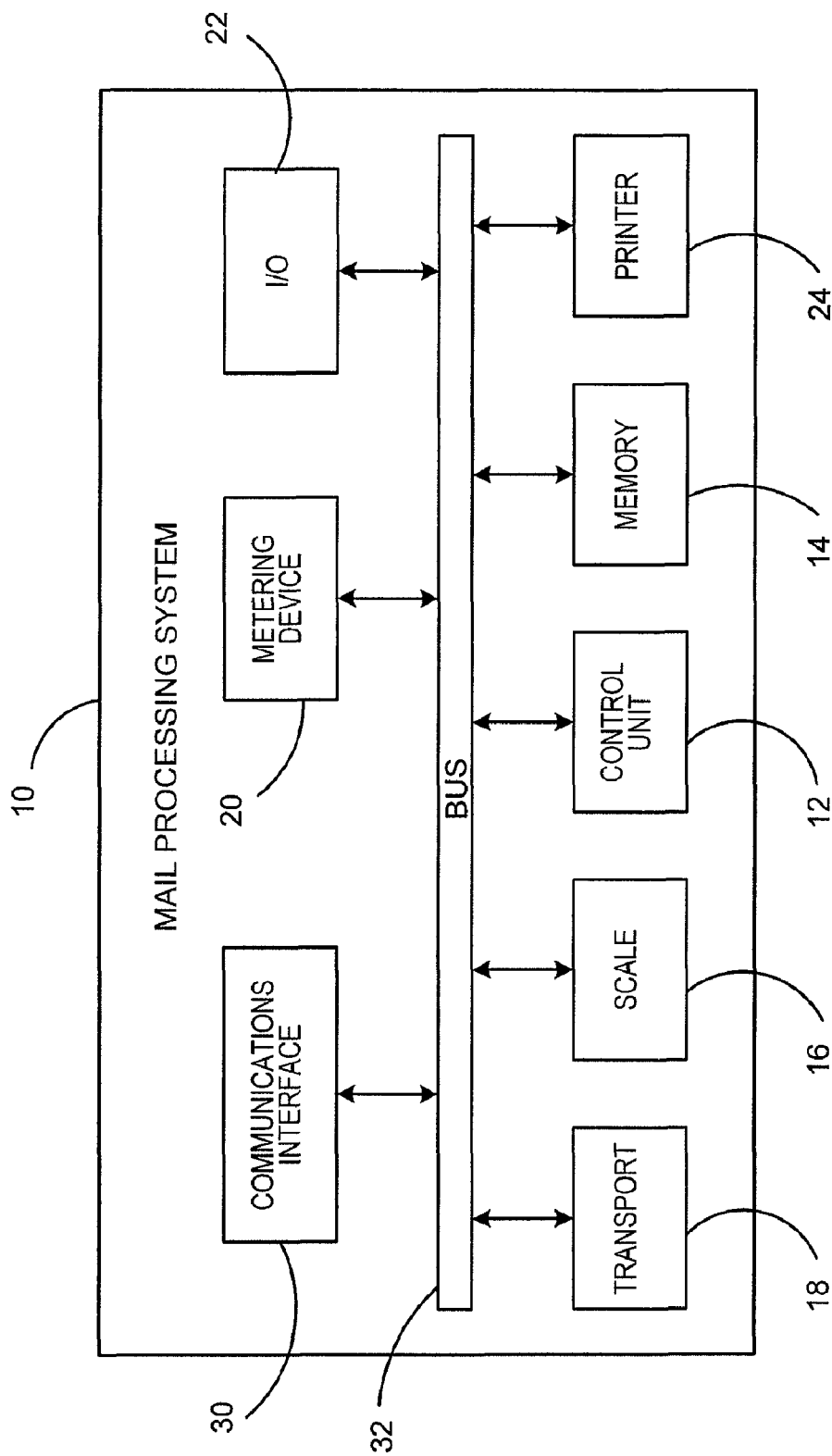
FIG. 1 illustrates in block diagram form a mail processing system according to an embodiment of the present invention.

In describing the present invention, reference is made to the drawings, wherein there is seen in FIG. 1 in block diagram form a mail processing system 10 according to an embodiment of the present invention. While the following description is provided with respect to a mail processing system 10, it should be understood that the present invention is not so limited and can be utilized with any device in which cryptographic operations are performed and where it is desired to provide security for the cryptographic keys used during the cryptographic operations. The mail processing system 10 includes a control unit (controller) 12, that preferably includes one or more controller units, such as, for example, a microprocessor, general or special purpose processor or the like, to control operation of the system 10. Specifically, the controller 12, in conjunction with one or more other processors or controllers (not shown), and instructions and data stored in a memory 14, provides all user interfaces, executes control of the mail processing system 10, calculates postage for debit based upon rate tables, provides the conduit for an associated metering device 20 to transfer postage indicia for printing, operates with peripherals for accounting, printing and weighing, and conducts communications, using a communications interface 30, e.g., modem or the like, with a data center for postage funds refill, software download, rates download, and market-oriented data capture. The controller 12, in conjunction with the metering device 20, provides the system meter that satisfies U.S. and international postal regulations regarding closed system information-based indicia postage (IBIP) meters. While metering device 20 is shown as an external device to the controller 12 in FIG. 1, the metering device 20 may also be embedded within the controller 12.

The mail processing system 10 includes one or more input/output devices 22 such as, for example, a keyboard, a display device, touch screen, and/or a scanner. A mail piece transport mechanism 18 may be utilized to transport mail pieces through different modules of the mailing machine for processing of the mail piece. The transport mechanism 18 can include, for example, rollers or belts that are utilized to move a mail piece through various processing stations of the mail processing system 10. The mail processing system 10 can also include one or more scales 16 that can be used to weigh mail pieces being processed by the system 10. The scale 16 may be integral with the transport 18 such that letters can be weighed as they are being transported. The scale 16 may also include a platform scale that can be used to weigh mail pieces that are too large to be processed through the system 10 using the transport 18.

The mail processing system 10 further includes a printer 24, such as, for example, an ink-jet or thermal type printer, that is utilized to print information on mail pieces being processed by the system 10. Such information could include, for example, an indicium that evidences payment of postage, address information, slogans and the like. Printer 24 is preferably adapted to print such information either directly on a mail piece, or alternatively on a tape that can be applied to a mail piece (for those mail pieces that are too large to be processed using the transport 18). Printer 24 could also be utilized to print receipts for processed mail or other types of reports associated with processed mail. Alternatively, printer 24 could comprise more than one printer. One or more communication buses 32 may be utilized to provide a communication path between each of the components of the mail processing system 10.

Figure 2:
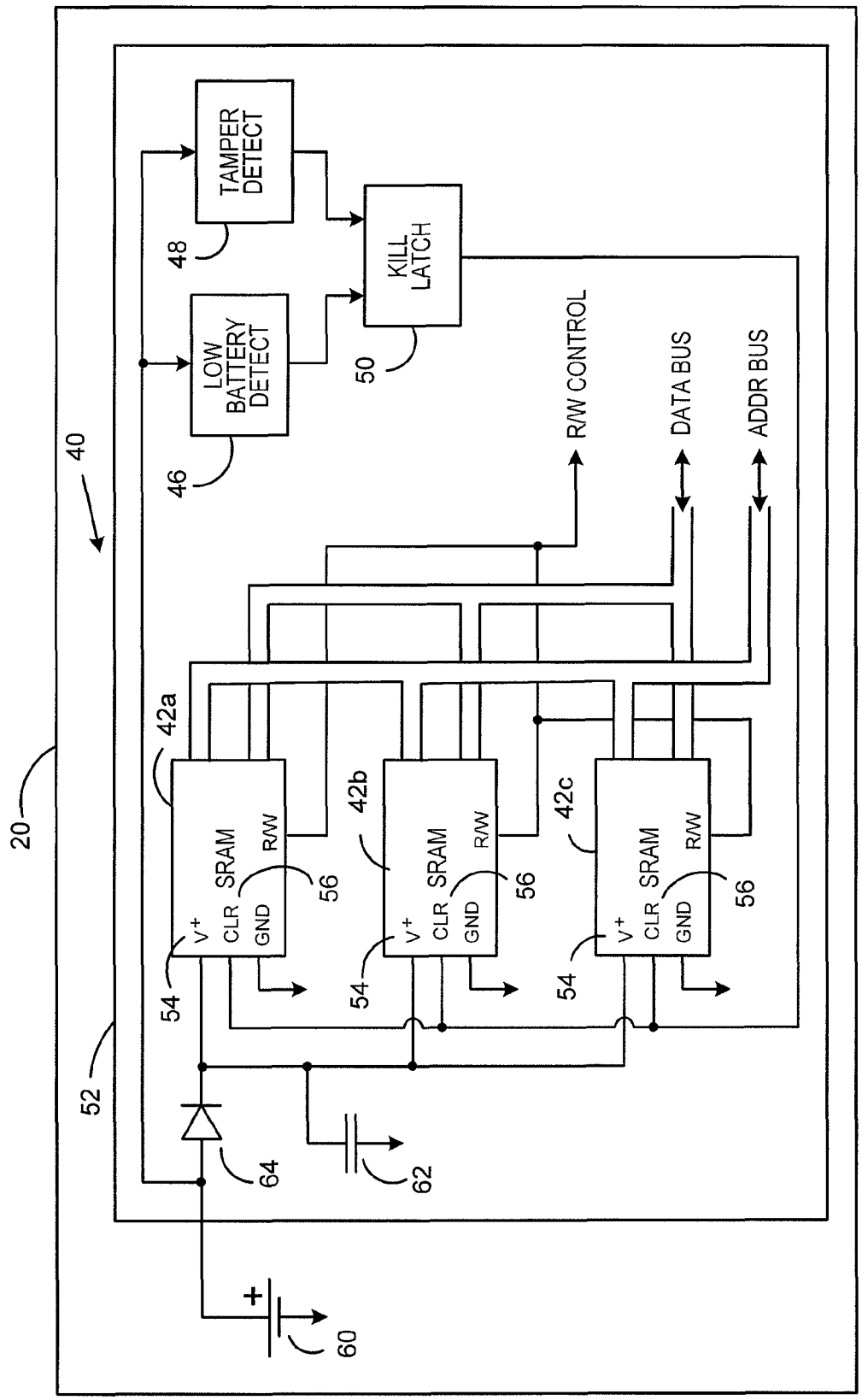
FIG. 2 illustrates in partial block diagram/schematic form the metering device of the system of FIG. 1.

FIG. 2 illustrates in partial block diagram/schematic form portions of the metering device 20 from FIG. 1 according to the present invention. More specifically, FIG. 2 illustrates a portion of an integrated circuit 40 provided as part of the metering device 20. Circuit 40 includes one or more memory clusters which may be implemented as static random access memory SRAM 42a, SRAM 42b, SRAM 42c, or other types of volatile memory. While three memory clusters 42a, 42b, 42c are illustrated, it should be understood that any number of memory clusters may be provided. The memory clusters are standard memory devices coupled to a Data Bus, and Address Bus, and a Read/Write (R/W) control input to communicate with a processing unit (not shown) of the metering device 20 when performing cryptographic operations. The memory clusters 42a, 42b, 42c store information utilized by the processing unit, including the cryptographic keys. Memory clusters 42a, 42b, 42c are provided with an external source of power in the form of a constant power source, e.g., battery 60, coupled to a power input 54 of each of the memory clusters 42a, 42b, 42c. Circuit 40 is, as noted above, preferably implemented as an application specific integrated circuit, therefore making it impossible to integrate the battery 60 within the boundary of the circuit due to the size of the battery 60.

Circuit 40 further includes a low battery detect circuit 46 utilized to detect if the voltage being supplied from battery 60 has dropped below some predetermined threshold. A tamper detect circuit 48 is also provided to prevent access to the circuit 40. Tamper detect circuit 48 typically includes a physical security boundary 52, such as a tamper grid or the like, that can detect attempts to physically penetrate the circuit 40. Each of the low battery detect circuit 46 and tamper detect circuit 48 are connected to the external battery 60 and provide an output signal to a kill latch 50. Kill latch 50 provides an output signal to an input 56 (CLR) of each of the memory clusters 42a, 42b, 42c. The CLR input 56 of each of the memory clusters 42a, 42b, 42c must be asserted as a high signal for a clearing operation not to occur. Thus, the kill latch outputs a high signal under normal operating conditions. In the event that the low battery detect circuit 46 detects the battery voltage has dropped below a predetermined threshold (which can be an indication of an attempted tamper activity) or the tamper detect circuit 48 detects a physical intrusion of the physical security boundary 52, a signal sent to the kill latch 50 will cause the output of the kill latch 50 to go low. A low input to the CLR input 56 of the memory clusters 42a, 42b, 42c will cause each of the memory clusters 42a, 42b, 42c to perform a clear operation and clear the contents of each memory cell therein, i.e., pull all memory cells low. The amount of time required for the clearing operation to complete from the time the kill latch 50 changes states (in response to the low battery detect circuit 46 or tamper detect circuit 48) is on the order of nanoseconds. In this manner, the data that is stored in the memory clusters 42a, 42b, 42c is maintained as confidential, as any tampering with the circuit 40 to try to obtain the data should result in the data being cleared almost immediately, rendering the tamper activity fruitless.

In order for the memory clusters 42a, 42b, 42c to perform the clearing operation when a low signal is provided on the CLR input 56, the memory clusters 42a, 42b, 42c must be provided with power in the form of an input voltage on the power input ($V^+$) 54. This power is provided by the external battery 60 under normal operating conditions. However, as noted above, a known attack is to short the power supply, e.g., battery 60, thereby rendering the memory clusters 42a, 42b, 42c unable to perform the clearing operation. To counter such an attack, a power source internal to the physical security boundary 52 is coupled to the power input ($V^+$) 54 of each of the memory clusters 42a, 42b, 42c. As illustrated in FIG. 2, the power source may be a capacitor 62. Capacitor 62 has a first node coupled to the power input 54 of the memory cells clusters 42a, 42b, 42c, and a second node coupled to ground. Capacitor 62 is sufficiently sized and rated to provide enough power to the memory clusters 42a, 42b, 42c to allow a clearing operation to be performed regardless of the state of the external battery 60. During normal operation, the capacitor 62 accumulates charge from the battery 60. If the battery 60 is shorted, the accumulated charge in the capacitor 62 provides power to each of the memory clusters 42a, 42b, 42c, thereby allowing the memory clusters 42a, 42b, 42c to perform an active clearing when the kill latch 50 responds to either the low battery detect circuit 46 or tamper detect circuit 48 detecting a tamper event. To prevent the capacitor 62 from discharging to ground through the shorted battery 60 during such an attack, a discharge prevention means, such as, for example, a blocking diode 64 or the like, is provided that has a first node coupled to the power input 54 and a second node coupled to the battery 60.

By integrating the capacitor 62 within the physical security boundary 52 of the circuit 40, the capacitor 62 is internal to the protective circuitry provided by the tamper detect circuit 48. Thus, it would not be possible to remove or tamper with the capacitor 62 without activating the tamper detect circuit 48 and clearing the memory clusters 42a, 42b, 42c. It should be noted that more than one capacitor 62 can be provided based on the number and size of the memory clusters 42. For example, each memory cluster may be provided with its own capacitor, or a single capacitor can be used to provide power to more than one memory cluster. Because the capacitor 62 provides sufficient power for the memory clusters 42a, 42b, 42c to perform an active clearing, the protective circuitry can operate as intended even when the battery 60 is short-circuited in an attempt to circumvent the protective circuitry. The active clearing of the memory clusters 42a, 42b, 42c during such an attack will protect the confidentiality of the cryptographic keys or other information stored in the memory clusters 42a, 42b, 42c, regardless of the state of the external power supply upon which the memory clusters 42a, 42b, 42c normally depend to perform the clearing operation.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

What is claimed is:

1. A cryptographic device comprising:
   a tamper detection circuit having a physical security boundary;
   a volatile memory device located within the physical security boundary;
   a battery, external to the physical security boundary, coupled to a power input of the memory device for providing power to the memory device under normal operating conditions;
   a capacitor, located within the physical security boundary, having a first node coupled to the power input of the memory device and a second node coupled to ground, the capacitor storing charge from the battery under normal operating conditions, the capacitor, when the battery is shorted, providing the stored charge to the memory device to allow the memory device to perform a clearing operation; and
   a discharge prevention means, located within the physical security boundary, having a first node coupled to the first node of the capacitor and a second node coupled to the battery, the discharge prevention means preventing the stored charge from the capacitor from discharging through the battery when the battery is shorted.

2. The cryptographic device of claim 1, wherein the memory device comprises a plurality of memory devices.

3. The cryptographic device of claim 1, further comprising:
   a latch having an input coupled to the tamper detection circuit and an output coupled to a clear input of the memory device, the latch, in response to receiving a signal from the tamper detection circuit indicating a tamper activity, causing a clear signal to be input to the clear input of the memory device, the memory device, in response to the clear signal from the latch, performing the clearing operation.

4. The cryptographic device of claim 1, wherein the discharge prevention means comprises a diode.

5. A mail processing system for processing mail pieces comprising:
   a control unit for controlling operation of the mail processing system;
   a printing device for printing information on mail pieces; and
   a cryptographic device for generating indicium to be printed on mail pieces, the cryptographic device comprising
      a tamper detection circuit having a physical security boundary;
      a volatile memory device located within the physical security boundary;
      a battery, external to the physical security boundary, coupled to a power input of the memory device for providing power to the memory device under normal operating conditions;
      a capacitor, located within the physical security boundary, having a first node coupled to the power input of the memory device and a second node coupled to ground, the capacitor storing charge from the battery under normal operating conditions, the capacitor, when the battery is shorted, providing the stored charge to the memory device to allow the memory device to perform a clearing operation; and
      a discharge prevention means, located within the physical security boundary, having a first node coupled to the first node of the capacitor and a second node coupled to the battery, the discharge prevention means preventing the stored charge from the capacitor from discharging through the battery when the battery is shorted.

6. The mail processing system of claim 5, wherein the discharge prevention means comprises a diode.

* * * * *